(12) United States Patent
Mil'shtein et al.

(10) Patent No.: US 9,773,151 B2
(45) Date of Patent: Sep. 26, 2017

(54) SYSTEM AND METHODS FOR CONTACTLESS BIOMETRICS-BASED IDENTIFICATION

(71) Applicant: University of Massachusetts, Boston, MA (US)

(72) Inventors: Samson Mil'shtein, Chelmsford, MA (US); Zachary Durkee, Fitchburg, MA (US); Christopher Leger, Tyngsboro, MA (US); Carl Buzawa, Carlisle, MA (US); Alex Gribov, Boston, MA (US); Anas Dahany, Boston, MA (US)

(73) Assignee: University of Massachusetts, Boston, MA (US)

( * ) Notice: Subject to any disclaimer, the term of this patent is extended or adjusted under 35 U.S.C. 154(b) by 0 days.

(21) Appl. No.: 14/616,182

(22) Filed: Feb. 6, 2015

(65) Prior Publication Data
US 2015/0220772 A1      Aug. 6, 2015

Related U.S. Application Data

(60) Provisional application No. 61/936,685, filed on Feb. 6, 2014.

(51) Int. Cl.
*G06K 9/00* (2006.01)

(52) U.S. Cl.
CPC ..... *G06K 9/00033* (2013.01); *G06K 9/00919* (2013.01)

(58) Field of Classification Search
None
See application file for complete search history.

(56) References Cited

U.S. PATENT DOCUMENTS 3,906,520 A * 9/1975 Phillips ............... A61B 5/1172
                                                         356/71
4,936,680 A    6/1990 Henkes
5,177,802 A    1/1993 Fujimoto
(Continued)

FOREIGN PATENT DOCUMENTS

DE    102009003765    10/2010
EP         1673713     6/2006
(Continued)

OTHER PUBLICATIONS

LINK: http://www.dhgate.com/product/fingerprint-time-attendance-system-with-stand/121164075.html.

*Primary Examiner* — Iman K Kholdebarin
(74) *Attorney, Agent, or Firm* — Valauskas Corder LLC (57) ABSTRACT

The present invention relates generally to a system and methods that facilitates the identification of an individual through the use of data. Certain more particular embodiments of the present invention facilitate the contactless acquisition and processing of biometric data for identification purposes from a biometric source. One preferred embodiment of the present invention of the system includes an apparatus by which is sized and shape to capture of one or more images of an portion of individual for processing and identification purposes. Advantageously, certain embodiments of the present invention facilitate the enrollment of one or more individuals for verification and identification purposes through the use of the data developed from the one or more captured images.

17 Claims, 9 Drawing Sheets

(56) References Cited

U.S. PATENT DOCUMENTS

| | | | |
|---|---|---|---|
| 5,719,950 | A | 2/1998 | Osten |
| 6,320,974 | B1 | 11/2001 | Glaze |
| 6,355,937 | B2 | 3/2002 | Antonelli |
| 6,404,904 | B1 | 6/2002 | Einighammer |
| 6,483,932 | B1 | 11/2002 | Martinez |
| 6,501,847 | B2 | 12/2002 | Helot |
| 7,031,502 | B1 | 4/2006 | Mil'shtein |
| 7,113,622 | B2 | 9/2006 | Hamid |
| 7,184,576 | B2 | 2/2007 | Kono |
| 7,266,223 | B2 | 9/2007 | Miura |
| 7,310,133 | B2 | 12/2007 | Nagasaka |
| 7,397,943 | B2 | 7/2008 | Merbach |
| 7,404,081 | B2 | 7/2008 | Murashita |
| 7,480,397 | B2 | 1/2009 | Ide |
| 7,587,071 | B2 | 9/2009 | Einighammer |
| 7,606,395 | B2 | 10/2009 | Hauke |
| 7,616,784 | B2 | 11/2009 | Kocher |
| 7,620,212 | B1 | 11/2009 | Allen |
| 7,672,488 | B2 | 3/2010 | Miura |
| 7,692,774 | B2 | 4/2010 | Sato |
| 7,777,808 | B2 | 8/2010 | Matsuo |
| 7,792,337 | B2 | 9/2010 | Higuchi |
| 7,831,072 | B2 | 11/2010 | Rowe |
| 7,890,158 | B2 | 2/2011 | Rowe |
| 7,911,596 | B2 | 3/2011 | Sato |
| 8,064,659 | B2 | 11/2011 | Nothaft |
| 8,121,354 | B2 | 2/2012 | Nagasaka |
| 8,243,131 | B2 | 8/2012 | Choi |
| 8,285,010 | B2 | 10/2012 | Rowe |
| 8,303,126 | B2 | 11/2012 | Moya, Jr. |
| 8,396,258 | B2 | 3/2013 | Fujisawa |
| 8,406,487 | B2 | 3/2013 | Abramovich |
| 8,489,506 | B2 | 7/2013 | Hammad |
| 8,582,831 | B2 | 11/2013 | Miura |
| 8,605,960 | B2 | 12/2013 | Orsley |
| 9,111,152 | B2 * | 8/2015 | Yabuki ............... H04L 63/0861 |
| 9,313,200 | B2 * | 4/2016 | Hoyos ............... H04L 63/0861 |
| 2004/0017934 | A1 | 1/2004 | Kocher |
| 2005/0226474 | A1 | 10/2005 | Merbach |
| 2005/0229007 | A1 * | 10/2005 | Bolle ................. G06F 21/32 713/186 |
| 2006/0093192 | A1 * | 5/2006 | Bechtel ............ G06K 9/00013 382/126 |
| 2006/0190836 | A1 | 8/2006 | Ling Su |
| 2007/0130547 | A1 | 6/2007 | Boillit |
| 2008/0001703 | A1 * | 1/2008 | Goto .................. H04M 1/0243 340/5.8 |
| 2008/0028230 | A1 * | 1/2008 | Shatford .............. H04L 9/3231 713/186 |
| 2008/0101664 | A1 | 5/2008 | Perez |
| 2009/0016574 | A1 * | 1/2009 | Tsukahara ............. A61B 5/117 382/117 |
| 2009/0135188 | A1 * | 5/2009 | Ding ................. G06K 9/00899 345/473 |
| 2009/0207251 | A1 * | 8/2009 | Kobayashi ......... G06K 9/00597 348/156 |
| 2009/0226052 | A1 * | 9/2009 | Fedele ............... G06K 9/00046 382/125 |
| 2009/0226054 | A1 | 9/2009 | Jelinek |
| 2010/0113952 | A1 | 5/2010 | Raguin |
| 2010/0172548 | A1 | 7/2010 | Mil'Shtein |
| 2010/0315498 | A1 | 12/2010 | Choi |
| 2010/0332400 | A1 | 12/2010 | Etchegoyen |
| 2011/0007951 | A1 | 1/2011 | Mil'shtein |
| 2011/0013809 | A1 * | 1/2011 | Abe .................. G06K 9/00885 382/115 |
| 2011/0041100 | A1 | 2/2011 | Boillot |
| 2011/0064282 | A1 | 3/2011 | Abramovich |
| 2011/0126280 | A1 * | 5/2011 | Asano .................. G06F 21/32 726/19 |
| 2012/0164984 | A1 | 6/2012 | Lopez |
| 2012/0249292 | A1 | 10/2012 | Wong |
| 2013/0070977 | A1 | 3/2013 | Orandi |
| 2013/0128223 | A1 * | 5/2013 | Wood ................. A61B 1/00034 351/206 |
| 2013/0215275 | A1 * | 8/2013 | Berini ..................... G06F 21/32 348/150 |
| 2013/0232073 | A1 | 9/2013 | Sheets |
| 2013/0243264 | A1 | 9/2013 | Aoki |
| 2013/0259330 | A1 * | 10/2013 | Russo ................ G06K 9/00087 382/124 |
| 2014/0133711 | A1 * | 5/2014 | Abe .................. G06K 9/00067 382/115 |
| 2014/0320291 | A1 * | 10/2014 | De Luca ................ G08B 21/20 340/573.1 |
| 2015/0095352 | A1 * | 4/2015 | Lacey ................ G06F 17/30011 707/752 |
| 2015/0130917 | A1 * | 5/2015 | Mil'shtein ......... G06K 9/00033 348/77 |
| 2015/0324566 | A1 * | 11/2015 | Miura ................. G06K 9/0004 726/19 |

FOREIGN PATENT DOCUMENTS

| | | |
|---|---|---|
| JP | 2001167255 | 6/2001 |
| JP | 2007193502 | 8/2007 |
| JP | 2010218039 A * | 9/2010 |
| WO | 2005045746 A1 | 4/2005 |
| WO | 2013124843 A1 | 8/2013 |

* cited by examiner

SYSTEM AND METHODS FOR CONTACTLESS BIOMETRICS-BASED IDENTIFICATION

CROSS REFERENCE TO RELATED PATENTS

This application claims the benefit of U.S. Provisional Patent Application No. 61/936,685 filed Feb. 6, 2014, which is incorporated by reference.

STATEMENT REGARDING FEDERALLY SPONSORED RESEARCH

This invention was made with government support under S51000000012539 awarded by the U.S. Department of Justice. The government has certain rights in the invention.

FIELD OF THE INVENTION

The present invention relates generally to a system and methods that facilitates the identification of an individual through the use of data. Certain more particular embodiments of the present invention facilitate the contactless acquisition and processing of biometric data for identification purposes. Certain preferred embodiments of the present invention of the system include apparatus by which the capture of one or more images of an individual may be facilitated for further processing. Advantageously, certain embodiments of the present invention facilitate the enrollment of one or more individuals for verification and identification purposes through the use of the data developed from the one or more captured images.

BACKGROUND OF THE INVENTION

A variety of systems and methods have been developed by which individuals may be identified so as, for example, to determine whether an individual may be permitted access or use a service or apparatus.

One traditional means of identification uses a token, such as a social security card, driver's license, passport, or key card, by which an individual may be identified. In such case, each individual that seeks to be identified through the use of the token must complete the necessary steps first to acquire the token. The completion of these steps may take a large amount of time. For example, it is well known that a person seeking to acquire a passport must obtain, fill out, and submit an application, then wait days and possibly weeks for the application to be reviewed and the analog passport dispatched to the person. The person must carry the analog passport in order to be able to use the passport as a means of identification. Many such token-based identification systems are based on at least a first assumption that whoever has possession of the token is actually the person identified by the token. Since certain lost or stolen tokens can provide, for example, access to unauthorized individuals, individuals using such tokens for identification purposes must take additional steps to maintain possession of the token at all times. To prevent unauthorized use, tokens often include additional complex features to help verify that the person having possession of the token is, in fact, the person authorized to have or identified by the token.

Another traditional means of identification is based on the use of information that is intended to be unique to each individual. Examples of information that are used for such knowledge-based identification systems include charge card numbers, social security numbers, passwords, mother's maiden names, and personal identification numbers ("PIN"). A person with knowledge of the information can, for example, gain access to a service or the use of an apparatus. However, as with token-based identification systems, knowledge-based identification systems can be misused. The information can be improperly obtained and used.

Another means of identification uses biometric identifiers. Biometric identifiers are based on the physical characteristics of individuals that can be measured or quantified. Conventional biometric identifiers use either the physiological characteristics or the behavioral characteristics of individuals. The physiological characteristics of individuals that can be used to develop biometric identifiers can be obtained from a variety of biometric sources including fingerprints, palm prints, face recognition, DNA, and retina or iris recognition. Behavioral characteristics that can be used as biometric identifiers include the typing rhythm, the gait, and the voice of individuals.

One or more disadvantages are associated with most conventional biometric-based identification systems. For example, behavioral characteristics—such as individual gait or voice patterns—are not inherently unique to one individual and may be imitated. While a physiological characteristic—such as a finger print, the retinal characteristics, or the DNA of an individual—does provide a unique identifier, the conventional systems and methods that are used to generate such biometric identifiers typically require the expenditure of considerable time, money, and other resources to develop the information and, in the case of a DNA-based biometric system, can raise a variety of privacy concerns. Also, many conventional systems that require an individual to match the stored biometric identifier in order, for example, to lock or unlock an apparatus or obtain a service have various shortcomings associated with them. To illustrate this point, the acquisition and use of a certain biometric identifier—fingerprints—for purposes of locking and unlocking cellular telephones will now be discussed.

Cellular telephones are one of the most widely used technological devices on the planet. Cellular telephones are used not only to place and receive phone calls, but also communicate through other messaging, plus as digital still and video cameras, music and video players, and lightweight computers. Given all these uses, individuals have come to acquire and retain some of their most private information on cellular telephones.

To prevent unauthorized access to this private information, and overall the use of misappropriated cell phones, a variety of systems have been developed. One common system permits an owner to select a password that must be entered into the phone before any further access or use is permitted. However, in order to gain quick access to and be able to use the phone, most people choose a password that is short in length and easy to remember. The security of such a phone is easily compromised. To improve the security of the phones, some phone systems allow an individual to use the information obtained from a scan of a fingerprint or other body part as the basis for a password. The 15 million bits of information contained within a fingerprint can provide the basis for a password that is far more secure than the typical short combination of letters and numbers chosen by the public.

To obtain the information from a body part, such as a fingerprint, that can be used as the basis for a system password, typically an image of the body part must be captured. Some conventional systems for acquiring fingerprint images rely on the physical contact between the soft tissue of the examined finger and a scanning element.

However, this small degree of contact may distort the distance between fingerprint ridges and provide an image from which information is drawn that is difficult to duplicate when it used as a PIN. Some other conventional systems for acquiring fingerprints do not require that the chosen finger actually make contact with a scanning surface. However, such contactless systems may still produce a distorted image because of the movement of the finger while the scanning is taking place. Fingerprint image acquisition is considered the most critical step of an automated fingerprint authentication system as it determines the final fingerprint image quality and therefore on the eventual performance of the security system.

One particular shortcoming of many identification systems, including those using biometric identifiers, is that the original information from which the identifier is developed is often retained in memory so that it may be available for possible access at a later time. Such retention, however, creates a risk that the information may be improperly accessed and used to create a duplicate set of credentials. The weakest portion of any sophisticated communication protocol based on fingerprint imaging remains the possibility of a stolen identity caused by the hijacking and stealing of a user's prerecorded fingerprint image from the communication network or the cellular phone.

A demand therefore exists for a system and methods that facilitates the identification of an individual through the use of highly particularized data. The present invention satisfies the demand.

SUMMARY OF THE INVENTION

The present invention is a system and methods that facilitates the identification of an individual through the use of highly particularized data.

Certain preferred embodiments of the present invention permit the secure acquisition of data from a biometric source for the development of a password for enrollment purposes and the nearly contemporaneous erasure of the biometric data once the enrollment password has been developed. Through such use of the biometric data, a secured system is developed that permits access only to those who can provide verification of their enrollment in the system or who can be identified by the system. Advantageously, while the biometric data used for enrollment purposes is erased from the system, certain embodiments of the present invention may retain for security purposes the information that is submitted or collected when unauthorized access to the secured system is attempted.

In another embodiment, the invention includes methods for capturing a digital image of a body part, for example, a finger and its fingerprint, storing the fingerprint image in a temporary executable file, transforming the image into binary code, storing the binary code in memory, then erasing the original picture image of the body part from the memory and retaining the image converted into binary code for use as a password. Executing the transformation of the image into the binary code may be completed in a matter of milliseconds. The short time between taking the image of the body part and creating the password lessens the likelihood that anyone will access or steal the original biometric information.

Certain preferred embodiments of the present invention include apparatus sized and shape to facilitate the capture of one or more images from a biometric source for processing, verification, and identification purposes. Certain preferred embodiments of the present invention facilitate the collection of biometric data for enrollment or other purposes through the use of commonly used mobile devices. Certain embodiments of the present invention include apparatus that helps a user to position, align and stabilize apart of the user's body, such as a finger or retina, for scanning by the built-in optical camera on a wireless communication system and processing the captured image for identification purposes.

More specifically, certain of these preferred embodiments of the apparatus include one or more guide components that assist, for example, an individual to position the body portion used as a biometric identifier relative to the camera of a cell phone so that the body portion is brought within the focal range of the camera so that one or more images are captured. The guide component of certain of such preferred embodiments may include a guidance subsystem in which a guidance software is used to produce one or more guidance images on the display of the mobile device that visually assists the user in positioning the body portion in order that distortion free images may be more easily captured. The guide component may be a guide hardware element that may be positioned on the surface of the mobile device that visually directs a user where to position the necessary body part so that the camera of the mobile device may more easily capture one or more images of the body part for identification purposes. In certain embodiments, the guide hardware element may be used on a mobile device which includes also the guidance software that further assists the user in the positioning and capturing of images of the necessary body part.

Certain other preferred embodiments of the apparatus include a guide that includes a rest that is sized and shaped to be easily added to the exterior surface of a mobile device and that includes a positioning face that is sized and shaped such that the body part used as the biometric identifier can be stably positioned within the focal range of the camera of a cell phone to permit one or more distortion free images to be captured by the camera of the mobile device.

Certain preferred embodiments of the present invention includes an apparatus that may receive one or more interchangeable attachments—each of which may be sized and shaped to allow a certain body part to be firmly rested relative to the camera of a mobile device—that thereby permit a user to select which biometric source to utilize for the password protection. Such embodiments may include an interchangeable attachment that facilitates, for example, the positioning of a finger, the positioning of an eye and, more specifically, the retina, or another body part relative to the camera of the mobile device for the capture of one or more images of the body part.

An added embodiment of the present invention includes a filter attachment. The objective of the filter attachment is to permit a filter to be aligned with the flash light of the built-in camera to reduce the intensity of the flash. In this embodiment, the user may self-position or in motion, move the biometric source a suitable distance from the camera lens (e.g., approximately a quarter inch away or within the available focal length of the camera) and permit the auto focus feature of the camera to operate in order to capture an image from the biometric source.

Another embodiment of the present invention may include an attachment for any hand-held wireless communication system, such as, but not limited to, cell telephones, tablets, travel electronic gaming systems, e-readers etc. that allows for the fingerprint or retinal scan or related biometric data to serve as a password locking/unlocking mechanism in the hand-held hardware.

Certain preferred embodiments facilitate contactless fingerprinting, such that the user may use the optical camera built-in to many of the mobile devices which form components of wireless communication systems to register, store and recognize fingerprints.

An additional embodiment of the present invention is an apparatus and method that may be used by law enforcement officers for capturing biometric data that is available for immediate transfer to data base centers.

An added embodiment of the apparatus includes a very small chip, which is programmable to work with various operational systems used in mobile devices, such as current operational systems of Android, Apple, Microsoft and/or Linux as well as with any new operational systems which might be offered on the market.

A further embodiment of the apparatus facilitates its transfer data created using another communication system, including cell phone, tablet, computer etc.

In another embodiment, the invention is a method in which additional modifications to the image may include an editing subsystem having features such as an adaptive threshold, cropping, alignment, filtering, etc. depending on the operational system of the wireless hardware.

In another embodiment, the invention provides a method to prevent anyone of using a decoy, or copy obtained by any manner of the binary code of the fingerprint. This method creates a significant barrier for software hacking because the binary code fingerprint of a registered user is stored as a password to access the wireless communication device. This method prevents anyone from using a decoy, or a copy, for example, of the digitized fingerprint on very thin paper or transparent film. The described procedure creates a significant barrier to attempts to communicate with a network server where the digitized fingerprint of a registered user is stored as a password, but for a shortened temporary length, until verified.

In an additional embodiment, the invention provides a method to monitor and analyze the vibration pulse within the biometric source, such pulse being created by the flow of blood in the skin tissue. This method will assist in the prevention of illegal hacking caused by the use of body portions from corpses or material reproductions of a person's body part or the copied static images of the biometric source. One such method utilizes video film as an alternative to picture images. The video film is broken down into a number of picture images that are transformed into a larger binary code password protection method. To gain access to a communication device with a video film password, a user will attempt to access the device using the biometric source in a similar method to gain access using a picture image password but with film as the source code.

While the invention has been described with reference to exemplary embodiments, it will be understood by those skilled in the art that various changes may be made and equivalents may be substituted for elements thereof without departing from the scope of the invention. In addition, many modifications may be made to adapt a particular situation or material to the teachings of the invention without departing from the essential scope thereof. Therefore, it is intended that the invention not be limited to the particular embodiments disclosed for carrying out this invention, but that the invention will include all embodiments falling within the scope of the present application.

DETAILED DESCRIPTION OF EMBODIMENTS
OF THE INVENTION

The present invention is directed to the development and uses of a secured system 11, that is, a system or apparatus that uses an enrollment password generated through the following embodiments.

Figure 1:
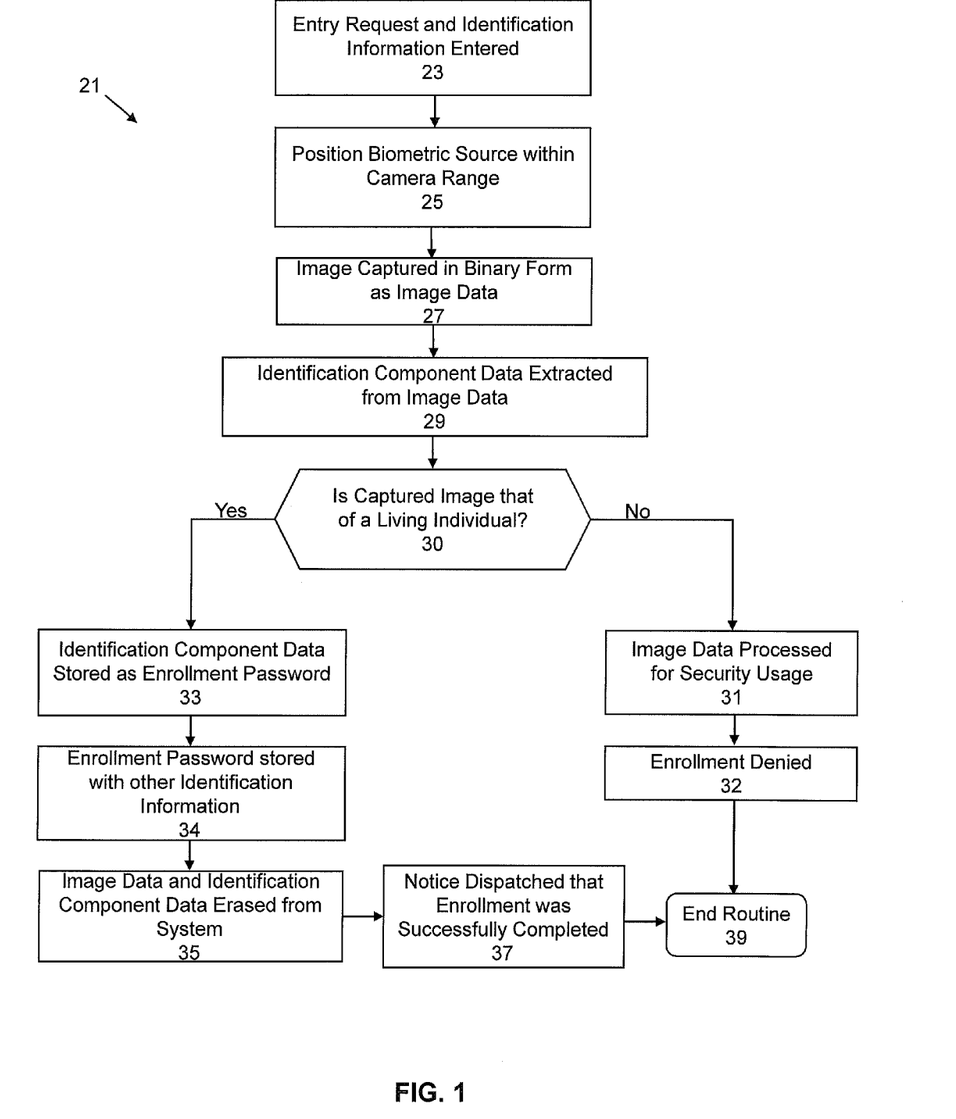
FIG. 1 illustrates a flow diagram of one preferred embodiment of the present invention directed to enrollment.

FIG. 1 depicts a flow chart of the operation of an enrollment routine 21 showing through function blocks and decision blocks one of the preferred embodiments that facilitates the enrollment of one or more individuals for the secured system 11. The routine 21 begins at block 23 with a user seeking to enroll in the secured system entering identification information that may eventually be joined with the information obtained from the processing of the one or more images captured from the biometric source. Such identification information may be a name, number, or other information. Certain embodiments of the present invention provide that the secured system may select the type (or types) of identification information that an individual seeking to enroll in the system 11 is requested to enter. Certain other embodiments of the present invention provide that the individual seeking to enroll selects the type or types of identification information to enter. Other embodiments provide a default option that the individual seeking to enroll enter information requested by the system 11 if the individual does not choose otherwise.

The user then positions a biometric source within the focal range of a camera 25. Certain embodiments of the present invention provide that the secured system 11 may select the biometric source or sources that an individual seeking to enroll in the system 11 is requested to position within the focal range of the camera. Certain other embodiments of the present invention provide that the individual seeking to enroll selects the biometric source or sources to use for enrollment purposes. Other embodiments provide a default option that, unless the individual chooses otherwise, the individual must position the biometric source or sources selected by the system 11. Biometric sources may include a finger, thumb, retina of the eye, facial feature or any other distinguishable body characteristic that is unique to the user. Such a camera may be that which is included in a mobile device.

The camera then captures one or more image in binary form 27. The image in binary form will be termed for purposes of this application as "image data".

Because the image that was captured, and therefore the image data may include unanticipated and unwanted artifacts, extraneous image components, and simply to normalize all the images that are used for enrollment purposes, certain preferred embodiments of the invention may process the image data to prepare what will be termed for purposes of this application as "identification component data" 29. The processing of the data that is inputted into the system 11 for enrollment purposes reduces the memory demands on the system 11 and permits the enrollment, verification, and authentication routines to operate more efficiently and quickly. The elements of the image data that are not used for further processing may be erased from the system. Alternatively, the complete image data may be retained at least until it is determined whether such information is needed for further security processing, as described below.

As represented by the decision block 30, the enrollment routine 21 then processes the identification component data to determine whether the captured image was that of a living individual or perhaps a decoy or artificial part made to resemble a living biometric source. If the answer is no, the image data may be processed for security usage 31. Such security usage 31 may be the notification of authorities that enrollment using a non-living biometric source was attempted. The image data may be retained to assist in any further investigations that may take place. Enrollment is then denied 32. If the system determines that the captured image is that of a living individual, the identification component data is stored as an enrollment password 33. The illustrated routine 21 may then store the enrollment password with other identification information 34—for example, the name of, or number or other information associated with the enrollee that was entered in function block 23. Advantageously, to prevent its unauthorized use by, for example, someone hacking into the system, the image data and the identification component data are erased 35. Notice that enrollment has been successfully completed is dispatched 37. The routine ends 39.

Figure 2:
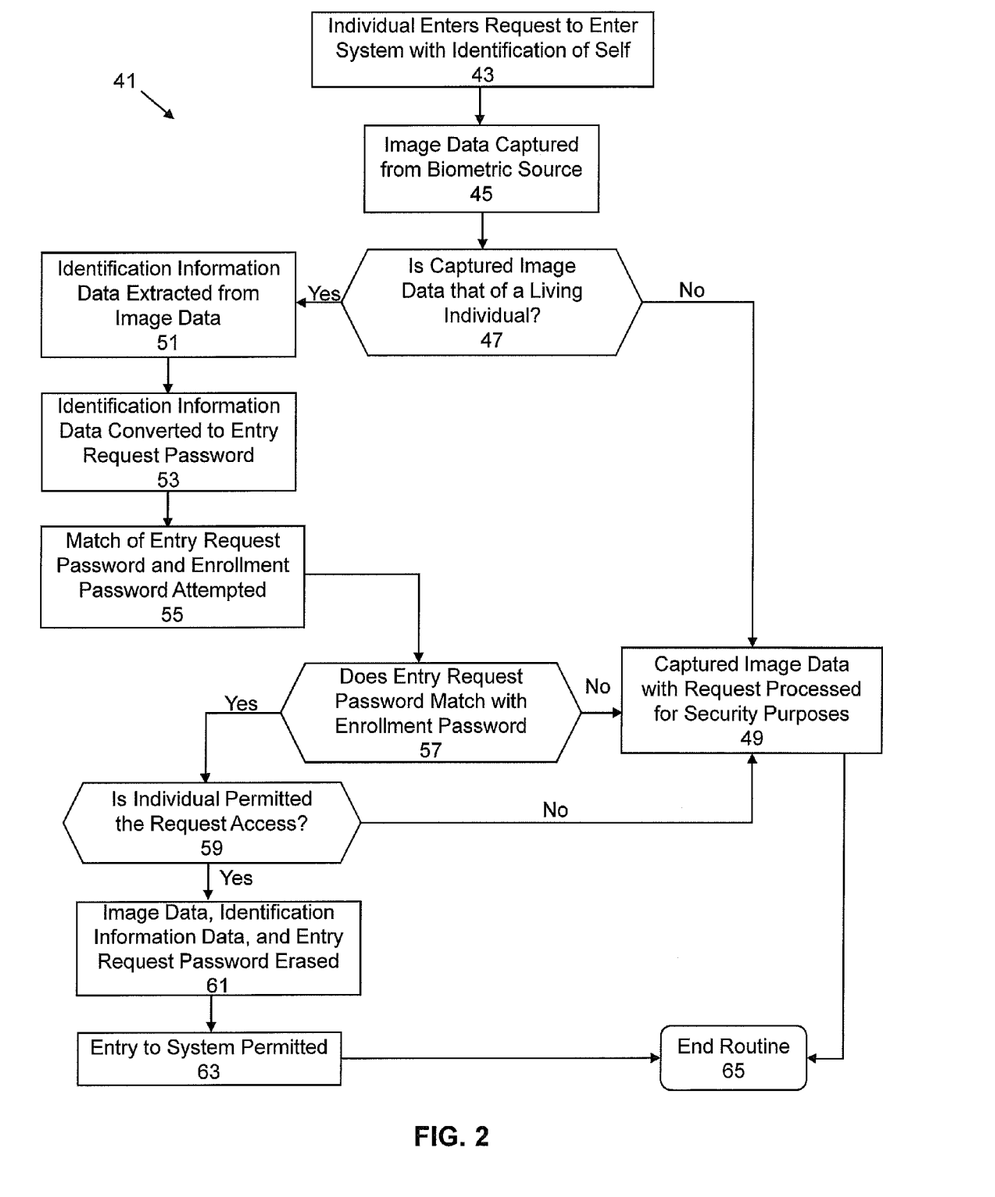
FIG. 2 illustrates a flow diagram of one preferred embodiment of the present invention directed to verification.

FIG. 2 depicts a flow chart of one of the preferred embodiments of a verification routine 41 according to the present invention. The verification (or authentication) routine operates to make a one-to-one comparison of data submitted for verification purposes from a biometric source with the data stored in a biometric database in order to verify that the individual seeking verification is, in fact, that person. In function block 43, an individual seeking, for example, to access a secured system 11—that is, a system or apparatus that uses the enrollment password generated through the use of the routine 21 illustrated in FIG. 1—must enter some identifying information 43. The identifying information may be a name, number or other information. As with the enrollment routine 21, the verification routine 41 may request that the person seeking verification enter—from the information entered at time of enrollment—that identification information which the system 11 selects, or that which the individual selects, or that which the system selects unless the individual chooses otherwise.

The user then must make available a biometric source for the capturing of an image so that image data may be developed 45. Such a biometric source may be, for example, always a certain body part or a body part chosen by the system 41. Advantageously, a system that chooses the body part that an individual seeking to gain access to a secured system on an ad hoc basis lessens the likelihood that a user can successfully use an artificial representation of a biometric source.

To further lessen the likelihood that a user can successfully use an artificial biometric source, the system will process the image data to determine whether the image that was captured was taken of a living individual 47. If the system 41 determines that the image data was not taken from a living individual, the request with identification information entered in function block 43 and the captured image data may be processed for security purposes 49. Such processing may include notifying authorities that unauthorized access to a secured system has been attempted. If the system 41 determines that the image data was obtained from a living individual, identification information data is extracted from the image data 51 (as described above). The identification information data is then converted to an entry request password 53. The system 41 then attempts to match the entry request password with the enrollment password 55 stored in a biometric database. If the entry request password does not match with the enrollment password for the individual identified in function block 43, the request with captured image data is processed for security purposes 49, as explained above. Even if the entry request password matches with the enrollment password, the system 41 may determine whether the individual seeking access is authorized to gain such access. If the individual seeking access is not authorized to obtain such access, the request with captured image data is processed for security purposes 49, as explained above. If the individual is permitted such access, the image data, the identification information data, and the entry request password are erased from the system 61. Such measures prevent someone from creating false credentials or the development of an unauthorized enrollment password. Access to the secured system is then permitted 63. The routine ends 65.

Figure 3:
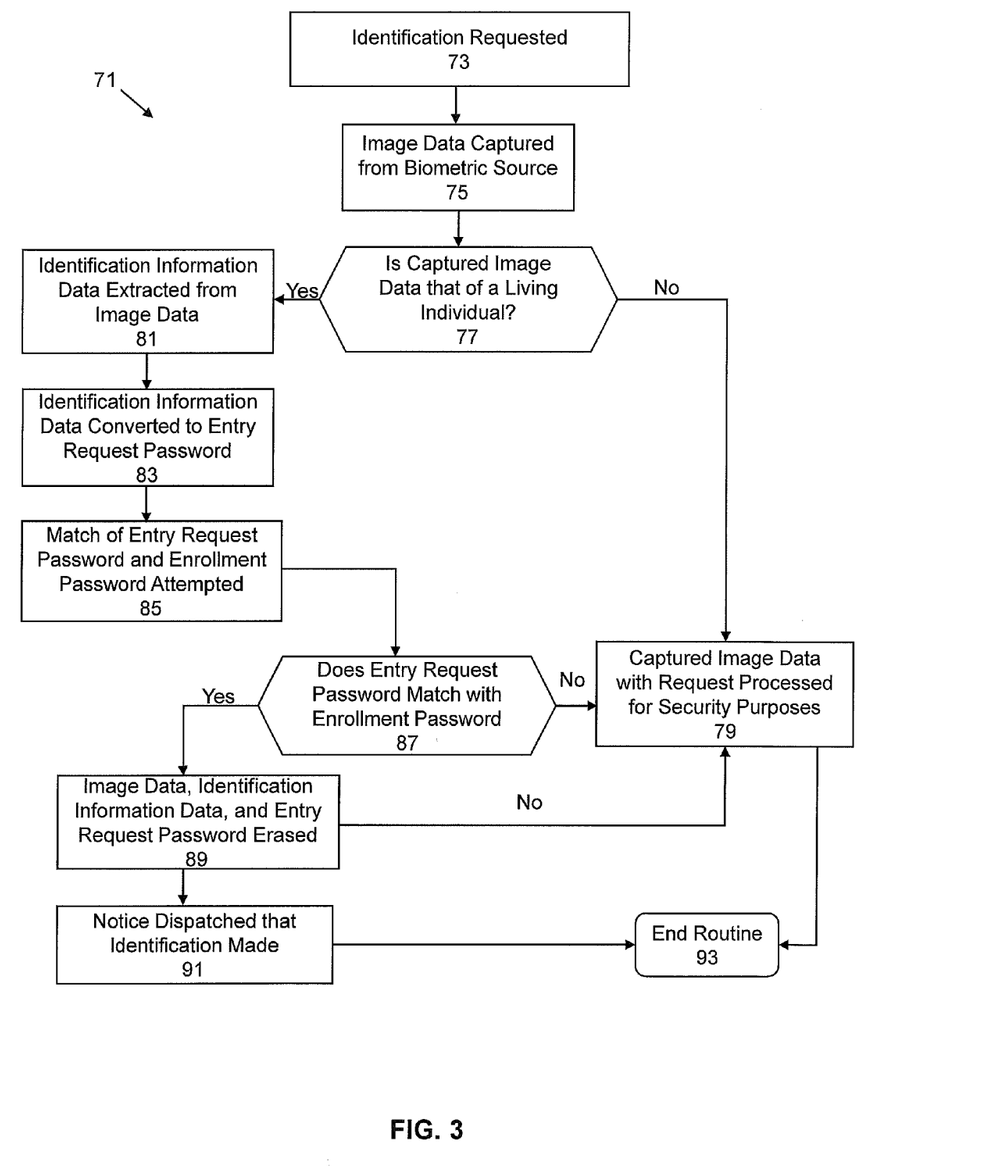
FIG. 3 illustrates a flow diagram of one preferred embodiment of the present invention directed to identification.

FIG. 3 depicts a flow chart of one of the preferred embodiments of an identification routine 71 according to the present invention. The identification routine 71 may be used, for example, to identify an individual who has not made any representation regarding his or her identity and therefore does not seek verification of that identity. In contrast to positive identification, the identification routine 71 may be used for negative identification purposes, that is, to provide information in order to establish the person cannot be as represented.

In block 73 of routine 71, the identification of the individual is requested. Such request may be voluntarily made by the individual such as by engaging with the secured system 11 knowing that it will attempt to identify him or her. The request may be involuntarily made, for example, when the individual unknowingly engages with a secured system 11 or engages with a secured system 11 not knowing that the system will attempt to identify the individual. Such an involuntary request may be made such as when a security person or law enforcement official seeks to identify who is a person who has been, for example, detained or arrested or a health care worker seeks to identify who is a person who has been received for treatment but without any identification (and possibly in a comatose state). The routine 71 requires that a biometric source be positioned such an image of it be captured and image data obtained 75. The circumstances may be such that the routine 71 is being operated without knowing whether a living person is the subject of the identification request. As with the verification routine 41, to further lessen the likelihood that a user can successfully use an artificial biometric source, the system will process the image data to determine whether the image that was captured was taken of a living individual 77. If the system 71 determines that the image data was not taken from a living individual, the image data, and possibly other information, may be processed for security purposes 79. Such processing may include dispatching notice that unauthorized access to a secured system 11 has been attempted. If the system 71 determines that the image data was obtained from a living individual, identification information data is extracted from the image data 81 (as described above). The identification information data is then converted to an entry request password 83. The system 71 then attempts to match the entry request password with the enrollment password 85 stored in a biometric database. If the entry request password does not match with any enrollment password in the biometric database, the request with captured image data is processed for security purposes 79, as explained above. If the individual is identified, the image data, the identification information data, and the entry request password are erased from the system 89. Such erasures of the image data prevents someone from creating false credentials or the development of an unauthorized enrollment password. Notice may then be dispatched that identification was successfully accomplished 91. The routine ends 93.

Figure 4:
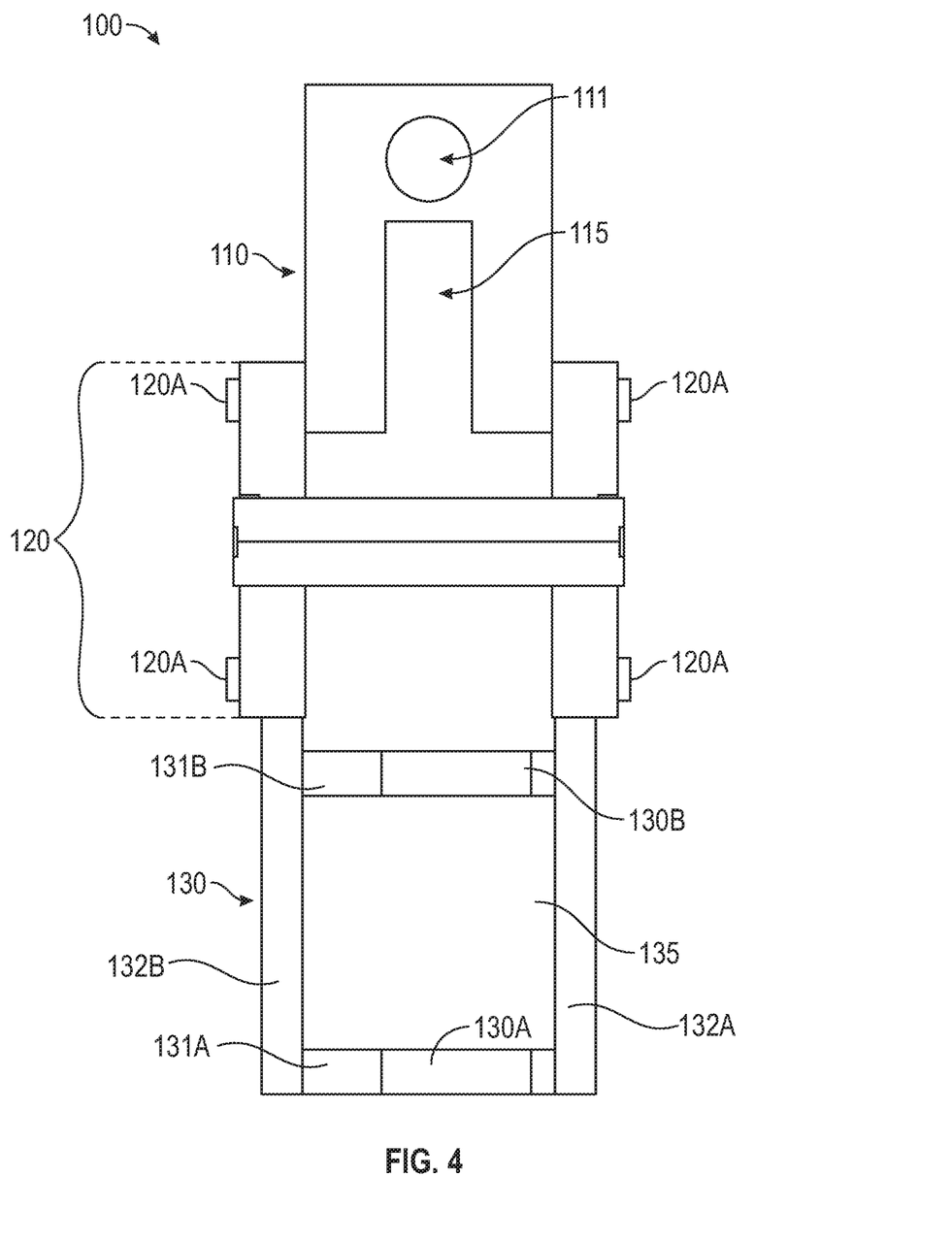
FIG. 4 illustrates one preferred embodiment of an apparatus according to the present invention in a fully extended position.

One preferred embodiment of an apparatus according to the present invention is the guidance system 100 illustrated in FIG. 4. Through the use of the system 100, an individual can more easily position the human body portion used as a biometric source identifier relative to the camera of a device or system in order that the body portion may be brought within the focal range of the camera for the capturing of one or more distortion free images that may be used in the routines 21, 41, 71, described above, and in other systems and methods. The guidance system 100 illustrated in FIG. 4 may be sized and shaped to be positioned on the surface of a mobile device. Examples of such mobile devices include cellular telephones, tablets, eBook readers, portable gaming system, or other electronic device with a built-in camera. Embodiments of the system 100 may be sized and shaped to permit their use with any device or system that may not necessarily be characterized as mobile such as, but not limited to certain laptops, desktops, gaming systems, televisions, blue-ray/DVD systems, sound systems, ATM banking machines, any financial transaction with a bank, credit union, e-trading or stock exchange, and any and all magnetic strip reading systems that currently does or could require a security code to gain access to an account or communication device. Such magnetic strip reading systems includes, but is not limited to, any merchant that requires payment for goods or services, any merchant that requires identification for goods or services, any government entity that requires identification for such purposes as country border crossing, airport or mass transportation access, voting, library, school identification, access into privileged government facilities, and access to university or educational-based facilities for either teaching or research purposes.

More specifically, the embodiment of the system 100 illustrated in FIG. 4 includes a lens plate 110, one or more spacing supports 120 and a biometric source attachment 130. The lens plate 110 shown in FIG. 4 includes a lens aperture 111 that is sized and shaped to allow a lens (not shown) to be aligned over the camera lens of the device to which the system 100 is positioned. Such a lens is one that assists a user to obtain a distortion free image or images of a biometric source placed in front of the camera. The lens may be one that improves the focal range of the mobile device camera for the capturing of the image or images.

Embodiments of the guidance system 100 may include a filter by which the intensity or color of the flash of the mobile device camera may be adjusted. The system 100 illustrated in FIG. 4 include a filter aperture 115 that is sized and shaped to allow a filter (not shown) to be placed over the light element of a mobile device. Such a filter is useful when the intensity of a flash light is too bright. When the camera flash is too bright, a grey-colored filter may be positioned in the aperture 115 to filter the light.

Figure 5:
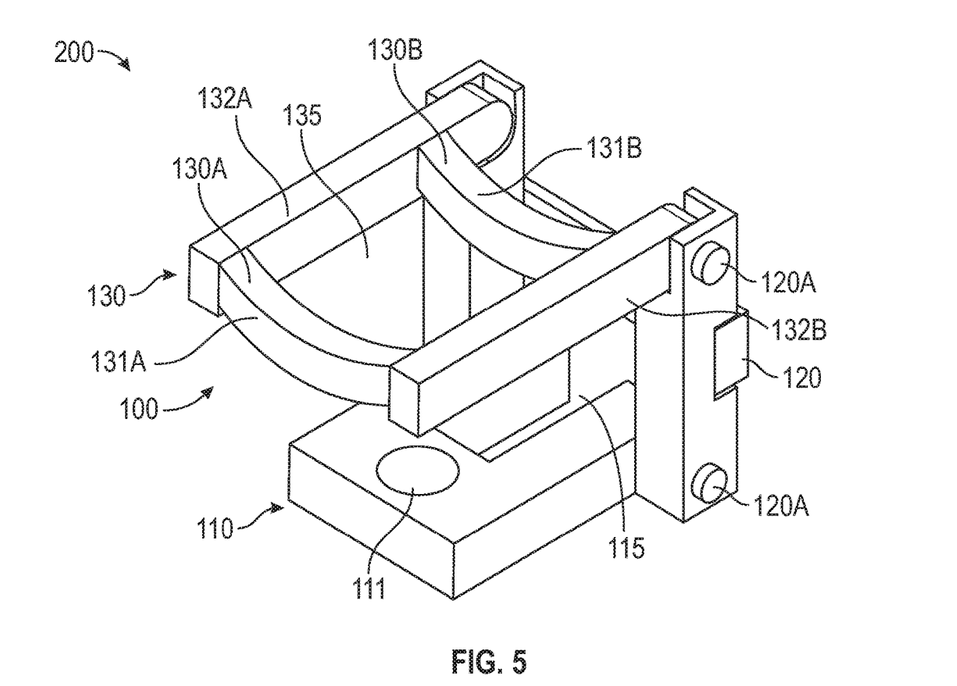
FIG. 5 illustrates the embodiment of the apparatus shown in FIG. 4 in an operational position.

The system 100 shown in FIG. 4 includes a biometric source attachment 130 that is sized and shaped to facilitate the stable placement of a biometric source relative to the camera, for example, of a mobile device (not shown). The biometric source attachment 130 may include a bridge element 131A including a face 130A that is sized and shaped with to receive and allow to rest in a stable position a human body part (not shown). The embodiment of the attachment 130 shown in FIG. 4 includes faces 130A, 130B of bridge elements 131A, 131B—each of which is more specifically is shaped as a small concave arc on which a portion of a human finger may be received—and a biometric source aperture 135 that may expose the desired portion of the body part such that one or more images of it may be captured by the camera of the mobile device. The bridge elements 13A, 132B are each positioned between support elements 132A, 132B. As shown in FIG. 4 and FIG. 5, the biometric source aperture 135 is formed by bridge elements 131A, 131B and support elements 132A, 132B. The biometric source attachment 130 may be dimensioned, for example, to accommodate any size of a finger or the thumb.

The system 100 illustrated in FIG. 4 includes spacing supports 120 by which the lens plate 110 is attached to the biometric source attachment 130 and stabilized with one or more connectors 120A.

In FIG. 5, the embodiment of the system 100 illustrated in FIG. 4 is shown in an operational position 200 in which the lens plate 110 is positioned in contact with, for example, an exterior surface plane of a mobile device (not shown), the spacing supports 120 aligned perpendicular to the same plane and providing distance so that, for example, a finger may rest on the faces 130A, 130B of the biometric source attachment 130. This configuration facilitates the capture of an optimized contactless fingerprint image.

Figure 6:
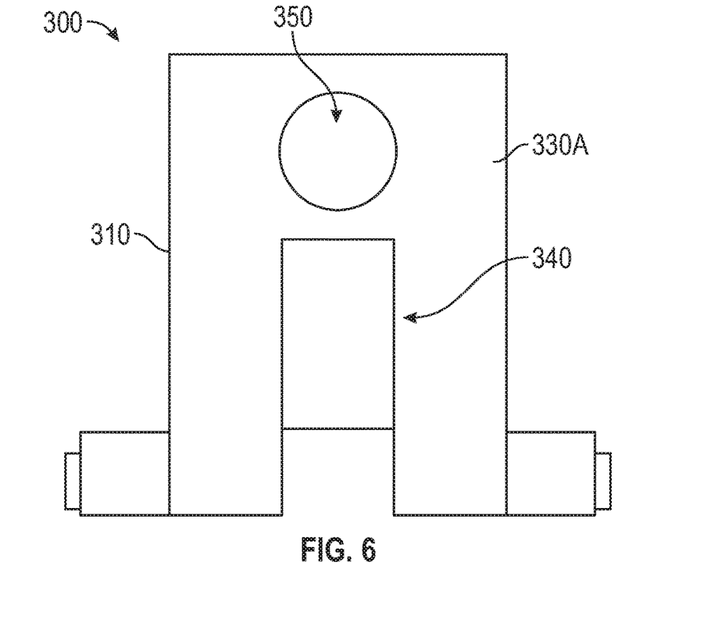
FIG. 6 illustrates another preferred embodiment of an apparatus according to the present invention.

FIG. 6 illustrates another apparatus according to the present invention. The illustrated apparatus provides a system 300 and includes a biometric source attachment 310 useful for eye retina or face stabilization for contactless identification. The attachment 310 is connected to the spacing supports 120 (not shown) and includes a filter 340 and an aperture 350 sized and shaped to allow the camera to capture an image of the eye retina or face resting adjacent to the face 330A of the biometric source attachment 310.

Figure 7:
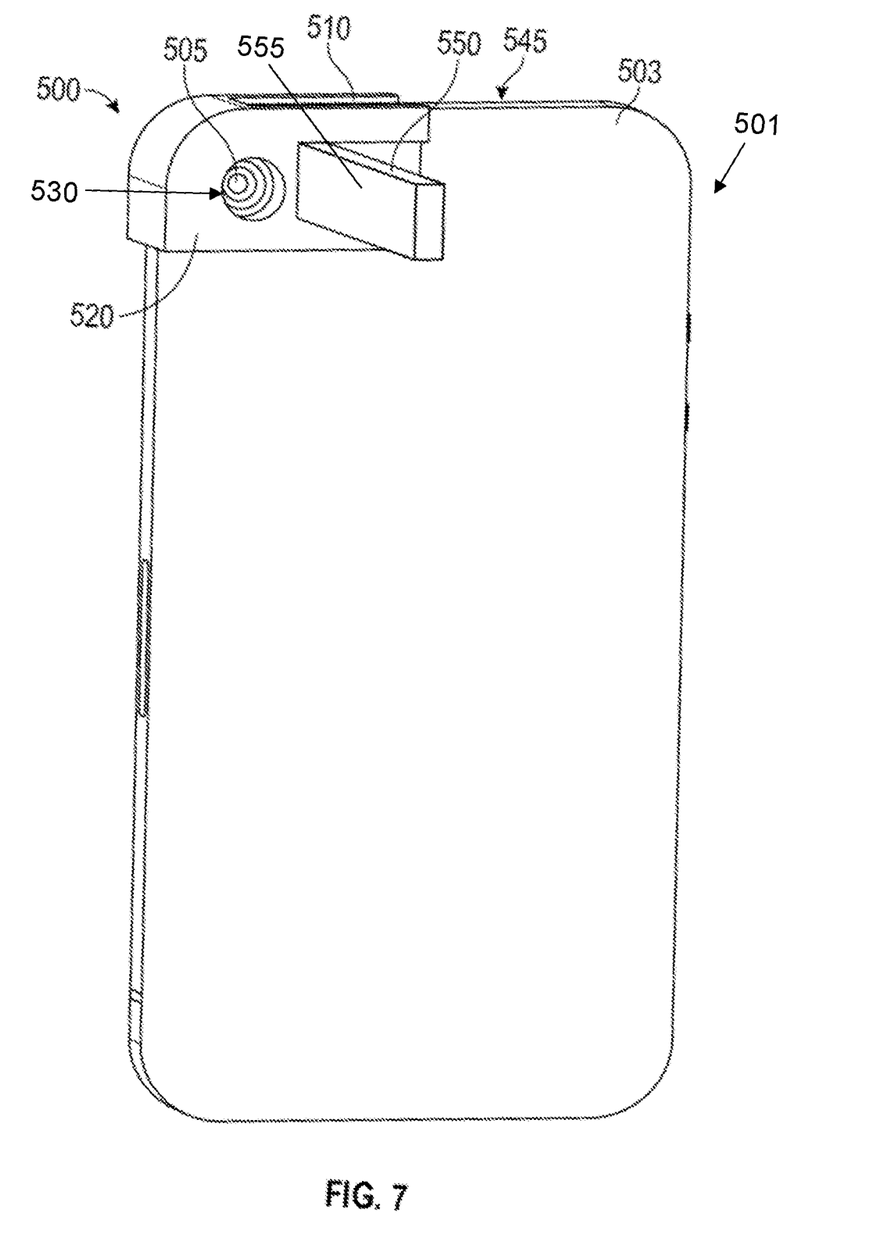
FIG. 7 illustrates an additional preferred embodiment of an apparatus according to the present invention.
Figure 8A:
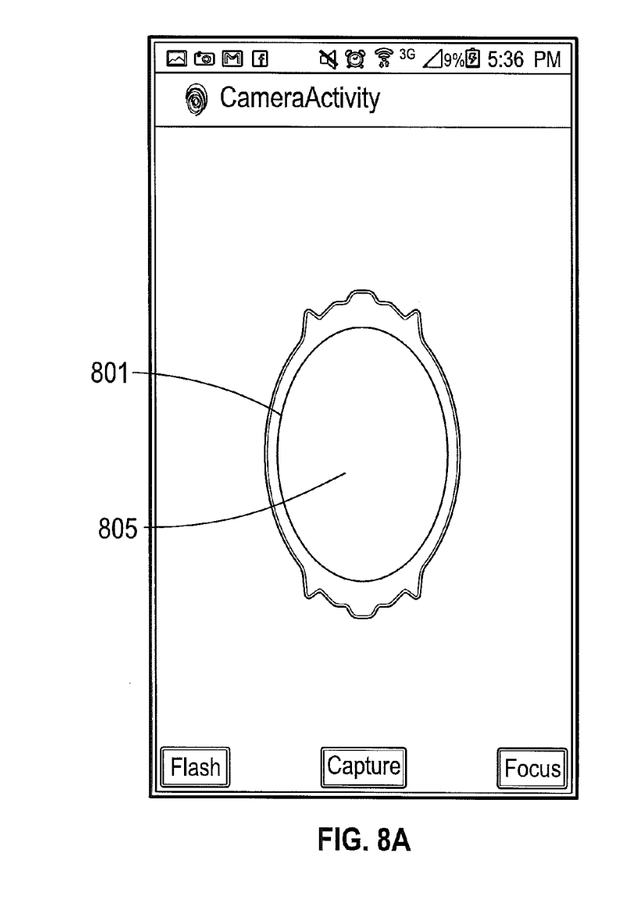
FIG. 8A illustrates the display of a mobile device including guide components developed through the use of an added preferred embodiment of the present invention.
Figure 8B:
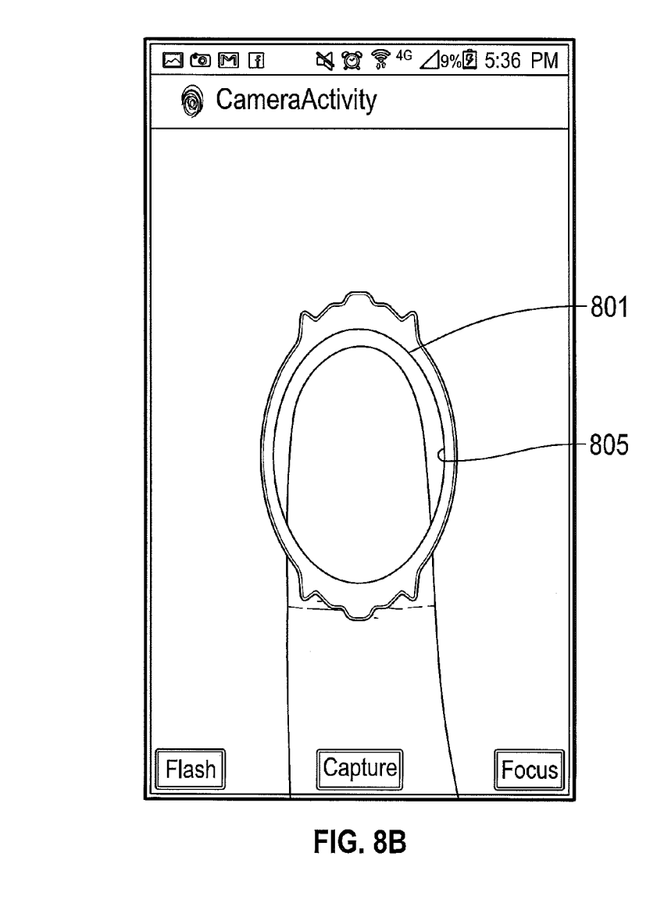
FIG. 8B illustrates the display shown in FIG. 8A with a captured image of a biometric source.

Another preferred embodiment of an apparatus according to the present invention is the guidance system 500 illustrated in FIG. 7. The guidance system 500 illustrated in FIG. 7 includes an inner surface 510—that is sized and shaped such that the system 500 may be easily received on the exterior surface 503 of a mobile communication device 501, a camera lens aperture 530 through which one or more images may be taken by the camera (not shown) through the camera lens 505 of the mobile device 501, and a guiding component 550 that can be moved from a flush position (not shown) to an erected position 545. The erected position 545 shown in FIG. 7 is generally perpendicular to the outer system surface 520 of the system 500. The guiding component 550 includes a guiding surface 555 relative to which an individual may position a body part in order to capture an image or images. Embodiments of the guidance system 500 may include a guiding component 550 that may be sized and shaped to allow different body parts to be positioned relative to the guiding surface 555 and the camera lens 505. Through the use of the system 500 an individual can more easily position the human body portion used as a biometric identifier relative to the camera of a device or system in order that the body portion may be brought within the focal range of the camera for the capturing of one or more distortion free images that may be used in the routines 21, 41, 71, described above, an Preferred embodiments of the present invention may include imaging guidance subsystem software that produces one or more guidance images on the display of the mobile device that visually assists the user in positioning the body portion in order that distortion free images may be more easily captured. FIG. 8A illustrates a guidance image 801 developed through the use of the imaging guidance software on the display of a mobile device. The guidance image 801 is an oval shape that provides a target aperture 805 for an individual to direct the positioning of the body part relative to the lens of the camera of the mobile device. FIG. 8B shows the body part—in this example, a finger—positioned such that the image of the tip of the finger is within the target aperture 805. The guidance software may direct the mobile device to capture the image automatically once the body part is within the target aperture 805.

Certain preferred embodiments of the present invention include an apparatus that may receive one or more interchangeable attachments—each of which may be sized and shaped to allow a certain body part to be firmly rested relative to the camera of a mobile device that thereby permit a user to select which biometric source to utilize for the password protection. Such This embodiments may include an allows a user to interchangeable attachment that facilitates, for example, the positioning of a finger, holder attachment, the positioning of an eye and more specifically, the retina attachment, or another body part relative to the camera of the mobile device for the capture of one or more images of the body part face attachment.

Figure 9A:
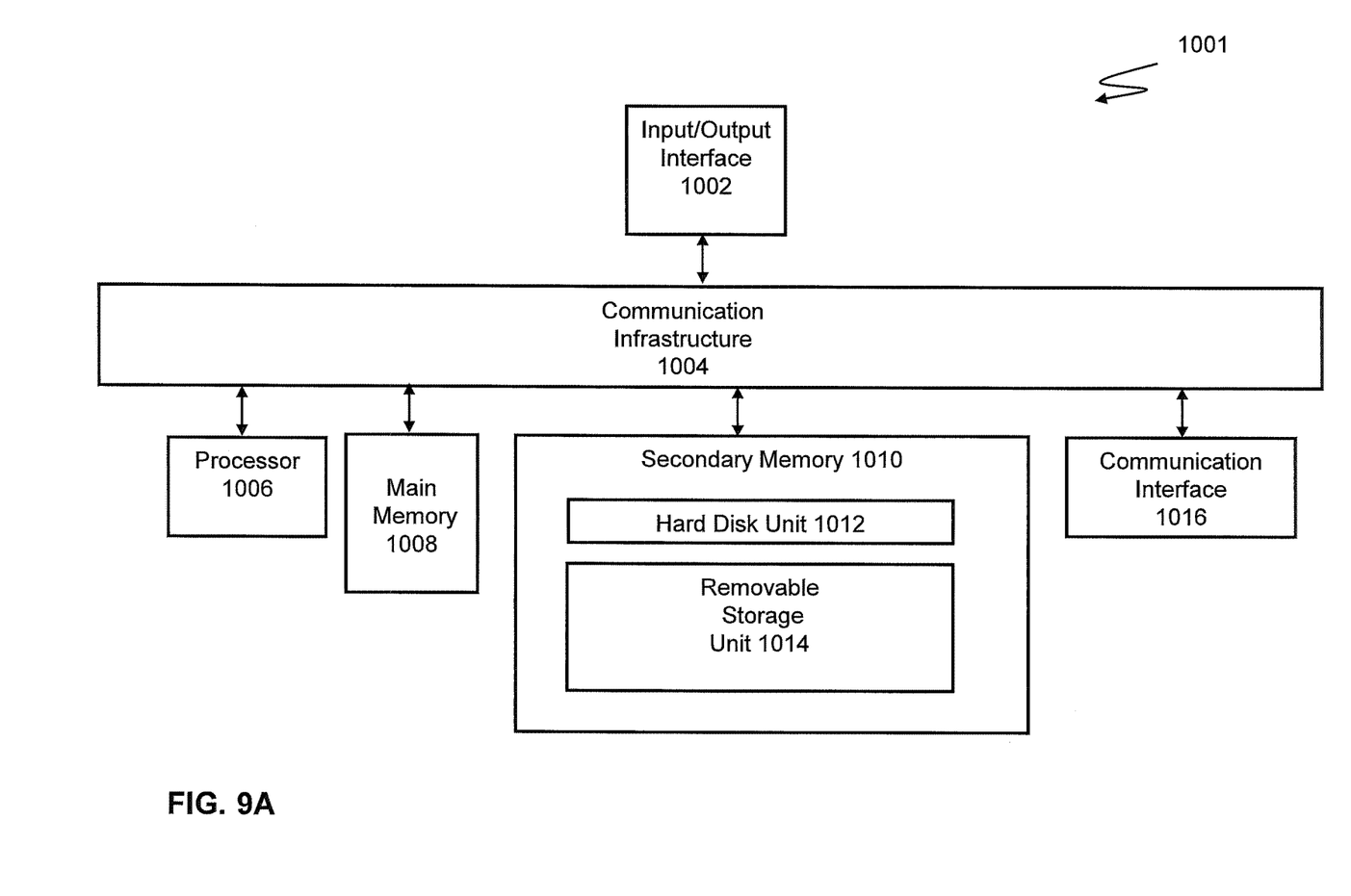
FIG. 9A is a schematic view of a computing system according to one preferred embodiment of the present invention.

FIG. 9A illustrates an exemplary computer system 1001 that may be used to implement the methods according to the invention. Computer system 1001 includes an input/output interface 1002 connected to communication infrastructure 1004—such as a bus—, which forwards data such as graphics, text, and information, from the communication infrastructure 1004 or from a frame buffer (not shown) to other components of the computer system 1001. The input/output interface 1002 may be, for example, a display device, a keyboard, touch screen, joystick, trackball, mouse, monitor, speaker, printer, Google Glass® unit, web camera, any other computer peripheral device, or any combination thereof, capable of entering and/or viewing data.

Computer system 1001 includes one or more processors 1006, which may be a special purpose or a general-purpose digital signal processor configured to process certain information. Computer system 1001 also includes a main memory 1008, for example random access memory (RAM), read-only memory (ROM), mass storage device, or any combination thereof. Computer system 1001 may also include a secondary memory 1010 such as a hard disk unit 1012, a removable storage unit 1014, or any combination thereof. Computer system 1001 may also include a communication interface 1016, for example, a modem, a network interface (such as an Ethernet card or Ethernet cable), a communication port, a PCMCIA slot and card, wired or wireless systems (such as Wi-Fi, Bluetooth, Infrared), local area networks, wide area networks, intranets, etc.

It is contemplated that the main memory 1008, secondary memory 1010, communication interface 1016, or a combination thereof, function as a computer usable storage medium, otherwise referred to as a computer readable storage medium, to store and/or access computer software including computer instructions. For example, computer programs or other instructions may be loaded into the computer system 1001 such as through a removable storage device, for example, a floppy disk, ZIP disks, magnetic tape, portable flash drive, optical disk such as a CD or DVD or Blu-ray, Micro-Electro-Mechanical Systems (MEMS), nanotechnological apparatus. Specifically, computer software including computer instructions may be transferred from the removable storage unit 1014 or hard disc unit 1012 to the secondary memory 1010 or through the communication infrastructure 1004 to the main memory 1008 of the computer system 1001.

Communication interface 1016 allows software, instructions and data to be transferred between the computer system 1001 and external devices or external networks. Software, instructions, and/or data transferred by the communication interface 1016 are typically in the form of signals that may be electronic, electromagnetic, and optical or other signals capable of being sent and received by the communication interface 1016. Signals may be sent and received using wire or cable, fiber optics, a phone line, a cellular phone link, a Radio Frequency (RF) link, wireless link, or other communication channels.

Computer programs, when executed, enable the computer system 1001, particularly the processor 1006, to implement the methods of the invention according to computer software including instructions.

The computer system 1001 described may perform any one of, or any combination of, the steps of any of the methods according to the invention. It is also contemplated that the methods according to the invention may be performed automatically.

The computer system 1001 of FIG. 9A is provided only for purposes of illustration, such that the invention is not limited to this specific embodiment. It is appreciated that a person skilled in the relevant art knows how to program and implement the invention using any computer system.

The computer system 1001 may be a handheld device and include any small-sized computer device including, for example, a personal digital assistant (PDA), smart hand-held computing device, cellular telephone, or a laptop or netbook computer, hand held console or MP3 player, tablet, or similar hand held computer device, such as an iPad®, iPod Touch® or iPhone®.

Figure 9B:
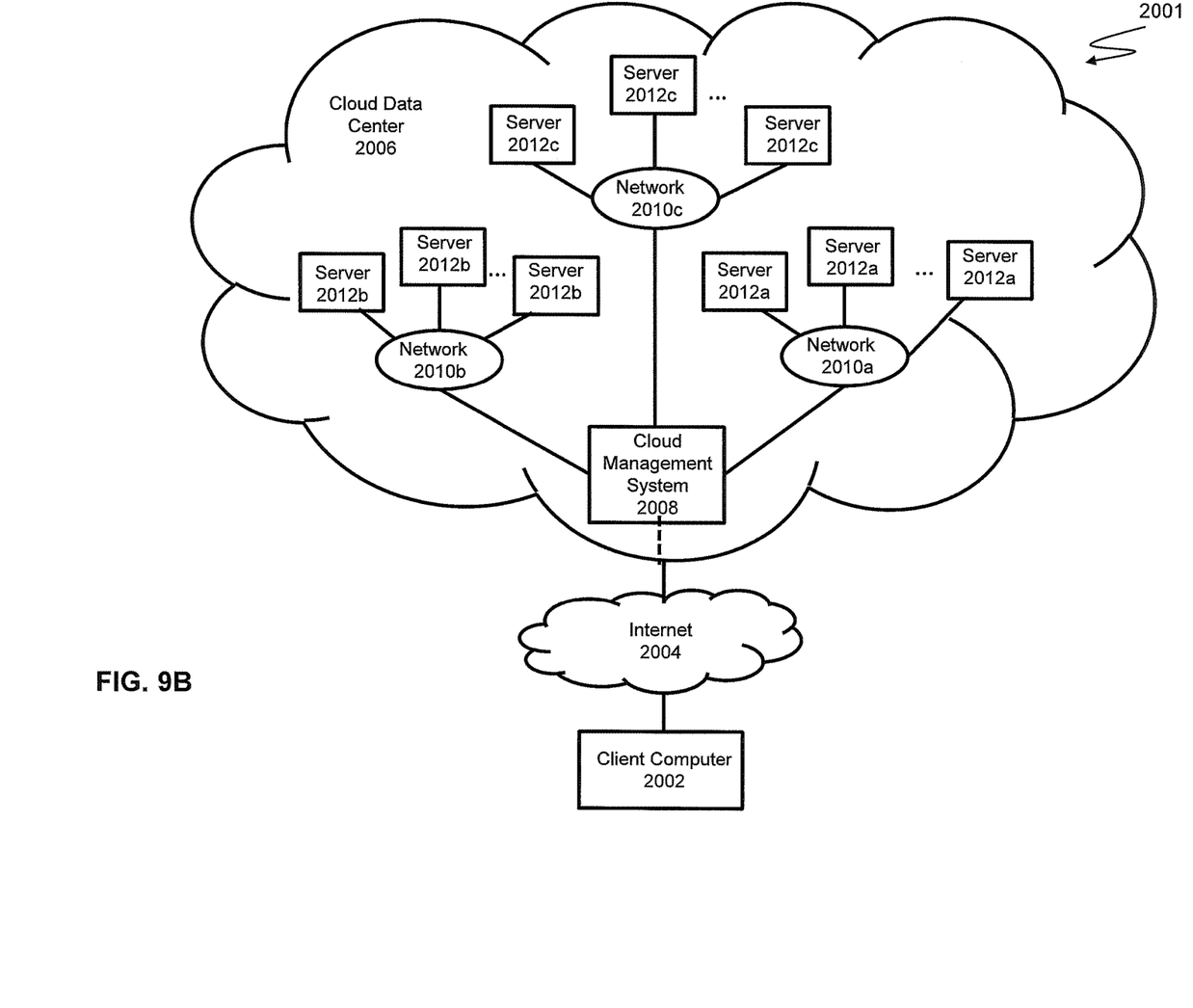
FIG. 9B is a schematic view of an exemplary cloud computing system according to one preferred embodiment of the present invention.

FIG. 9B illustrates an exemplary cloud computing system 2001 that may be used to implement the methods according to the present invention. The cloud computing system 2001 includes a plurality of interconnected computing environments. The cloud computing system 2001 utilizes the resources from various networks as a collective virtual computer, where the services and applications can run independently from a particular computer or server configuration making hardware less important.

Specifically, the cloud computing system 2001 includes at least one client computer 2002. The client computer 2002 may be any device through the use of which a distributed computing environment may be accessed to perform the methods disclosed herein, for example, a traditional computer, portable computer, mobile phone, personal digital assistant, tablet to name a few. The client computer #02 includes memory such as random access memory (RAM), read-only memory (ROM), mass storage device, or any combination thereof. The memory functions as a computer usable storage medium, otherwise referred to as a computer readable storage medium, to store and/or access computer software and/or instructions.

The client computer 2002 also includes a communications interface, for example, a modem, a network interface (such as an Ethernet card), a communications port, a PCMCIA slot and card, wired or wireless systems, etc. The communications interface allows communication through transferred signals between the client computer 2002 and external devices including networks such as the Internet 2004 and cloud data center 2006. Communication may be implemented using wireless or wired capability such as cable, fiber optics, a phone line, a cellular phone link, radio waves or other communication channels.

The client computer 2002 establishes communication with the Internet 2004—specifically to one or more servers—to, in turn, establish communication with one or more cloud data centers 2006. A cloud data center 2006 includes one or more networks 2010a, 2010b, 2010c managed through a cloud management system 2008. Each network 2010a, 2010b, 2010c includes resource servers 2012a, 2012b, 2012c, respectively. Servers 2012a, 2012b, 2012c permit access to a collection of computing resources and components that can be invoked to instantiate a virtual machine, process, or other resource for a limited or defined duration. For example, one group of resource servers can host and serve an operating system or components thereof to deliver and instantiate a virtual machine. Another group of resource servers can accept requests to host computing cycles or processor time, to supply a defined level of processing power for a virtual machine. A further group of resource servers can host and serve applications to load on an instantiation of a virtual machine, such as an email client, a browser application, a messaging application, or other applications or software.

The cloud management system 2008 can comprise a dedicated or centralized server and/or other software, hardware, and network tools to communicate with one or more networks 2010a, 2010b, 2010c, such as the Internet or other public or private network, with all sets of resource servers 2012a, 2012b, 2012c. The cloud management system 2008 may be configured to query and identify the computing resources and components managed by the set of resource servers 2012a, 2012b, 2012c needed and available for use in the cloud data center 2006. Specifically, the cloud management system 2008 may be configured to identify the hardware resources and components such as type and amount of processing power, type and amount of memory, type and amount of storage, type and amount of network bandwidth and the like, of the set of resource servers 2012a, 2012b, 2012c needed and available for use in the cloud data center 2006. Likewise, the cloud management system 2008 can be configured to identify the software resources and components, such as type of Operating System (OS), application programs, and the like, of the set of resource servers 2012a, 2012b, 2012c needed and available for use in the cloud data center 2006.

The present invention is also directed to computer products, otherwise referred to as computer program products, to provide software to the cloud computing system 2001. Computer products store software on any computer useable medium, known now or in the future. Such software, when executed, may implement the methods according to certain embodiments of the invention. Examples of computer useable mediums include, but are not limited to, primary storage devices (e.g., any type of random access memory), secondary storage devices (e.g., hard drives, floppy disks, CD ROMS, ZIP disks, tapes, magnetic storage devices, optical storage devices, Micro-Electro-Mechanical Systems (MEMS), nanotechnological storage device, etc.), and communication mediums (e.g., wired and wireless communications networks, local area networks, wide area networks, intranets, etc.). It is to be appreciated that the embodiments described herein may be implemented using software, hardware, firmware, or combinations thereof.

The cloud computing system 2001 of FIG. 9B is provided only for purposes of illustration and does not limit the invention to this specific embodiment. It is appreciated that a person skilled in the relevant art knows how to program and implement the invention using any computer system or network architecture.

What is claimed is:

1. A system for facilitating collection of biometric data comprising:
    one or more spacing supports to which are rotatably connected a biometric source attachment and a lens plate;
    said lens plate comprising a lens aperture, said lens plate rotatable such that said lens plate may be positioned adjacent to a mobile device with said lens aperture aligned over a camera lens of the mobile device;
    said biometric source attachment rotatable such that said biometric source attachment is spaced from said lens plate by said spacing supports,
    said biometric source attachment comprising a biometric source aperture formed by at least one bridge element and at least one support element, each bridge element positioned between two support elements and each bridge element including a face on which a human body part is firmly rested so that one or more distortion free images of the human body part exposed within the biometric source aperture is captured by operation of the camera lens of the mobile device and processed for the collection of the biometric data.

2. A system according to claim 1, wherein said face of said biometric source attachment is sized and shaped to receive a portion of a human finger.

3. A system according to claim 1, wherein said face of said biometric source attachment is sized and shaped to receive some or all the human body adjacent to an eye retina or another identifying facial characteristic.

4. A system for facilitating contactless collection of biometric data comprising:
    a guidance system including an outer surface and an inner surface, the guidance system sized and shaped to be received on an exterior corner area of a mobile communication device;
    said guidance system including an aperture sized and shaped to permit a camera of the mobile communication device to capture one or more images therethrough for processing and production of the biometric data;
    said guidance system further including a guiding component rotatable between an erected position and a flush position, in the erected position said guiding component generally perpendicular to the outer surface, a biometric source aligned to a guiding surface of the guiding component in the erected position for the capture of the one or more images for processing and production of the biometric data.

5. The system according to claim 4 further including an imaging guidance subsystem through which one or more guidance images are producible on a display of the mobile communication device to facilitate the capture of the one or more images.

6. A method for facilitating secure enrollment in a secured system through use of biometric data, using a machine including a wireless communication device, comprising:

entering identification information;

positioning adjacent to the machine a guidance system comprising a biometric source attachment and a lens plate, the lens plate including a lens aperture and the biometric source attachment comprising a biometric source aperture formed by one or more bridge elements and one or more support elements, each bridge element positioned between two support elements;

aligning the lens aperture to a camera lens of the machine;

resting a biometric source on the one or more bridge elements of the biometric source attachment;

capturing one or more images of the biometric source exposed within the biometric source aperture as image data;

extracting identification component data from the image data;

determining whether the one or more images were captured from a living individual;

storing the identification component data as an enrollment password with the identification information upon determination that the one or more images were captured from a living individual;

erasing the image data and the identification component data from the machine; and dispatching notice that secure enrollment has been completed.

7. The method according to claim 6 further including processing the image data for security purposes if the one or more images were not captured from a living individual.

8. A method for facilitating secure verification of individual identity through use collection of biometric data, using a machine including a wireless communication device, comprising:

entering identification information;

positioning adjacent to a surface of the machine a guidance system, the guidance system including a camera lens aperture and a rotatable guiding component;

matching the camera lens aperture with a camera lens of the machine;

rotating from a flush position the guiding component to an erected position perpendicular to the surface of the machine;

using the guiding component to align a biometric source;

capturing by the camera of the machine one or more images of the biometric source as image;

determining whether the one or more images were captured from a living individual;

extracting identification component data from the image data upon determination that the one or more images were captured from a living individual;

converting the identification component data to an entry request password;

attempting to match the entry request password with pre-registered biometric data;

erasing the image data, the identification information data, and the entry request password if the entry request password matches with the pre-registered biometric data; and verifying the individual identity.

9. The method according to claim 4, wherein the biometric source comprises a portion of a finger.

10. The method according to claim 4, wherein the biometric source comprises a portion of an eye retina.

11. The method according to claim 4, wherein the image data comprises a portion of a fingerprint.

12. The method according to claim 6, wherein the biometric source comprises a portion of a finger.

13. The method according to claim 6, wherein the biometric source comprises a portion of an eye retina.

14. The method according to claim 6, wherein the image data comprises a portion of a fingerprint.

15. The method according to claim 8, wherein the biometric source comprises a portion of a finger.

16. The method according to claim 8, wherein the biometric source comprises a portion of an eye retina.

17. The method according to claim 8, wherein the image data comprises a portion of a fingerprint.

* * * * *